United States Patent Office 3,193,557
Patented July 6, 1965

3,193,557
PROCESS FOR PREPARING 2-β-METHOXY-ETHYLPYRIDINE
William Glynne Moss Jones and Marcus Andrew Stevens, Macclesfield, England, assignors to Imperial Chemical Industries Limited, London, England, a corporation of Great Britain
No Drawing. Filed June 11, 1962, Ser. No. 201,313
Claims priority, application Great Britain, June 26, 1961, 22,994/61
15 Claims. (Cl. 260—297)

This invention relates to a process for the manufacture of a heterocyclic organic compound and more particularly it relates to the manufacture of 2-β-methoxyethylpyridine which possesses valuable anthelmintic properties.

According to the invention we provide a process for the manufacture of 2-β-methoxyethylpyridine which comprises heating a 2:3-dihydro-4-H-oxazino(2,3a)-pyridinium salt of the formula:

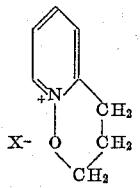

wherein X stands for an anion, with methanol in the presence of a base.

The anion X may be derived from an inorganic acid or from an organic acid and it may be for example a halide for example bromide, chloride or iodide, sulphate, nitrate, acetate, tartrate, salicylate or toluenesulphonate.

The base may be, for example, an alkali metal or an alkaline earth metal hydroxide or an alkali metal methoxide. A particularly suitable alkali metal hydroxide is sodium hydroxide and a particularly suitable alkali metal methoxide is sodium methoxide.

The reaction may optionally be carried out in the presence of a diluent or solvent for example water or toluene and it may be conducted at atmospheric or at superatmospheric pressure.

The process may be carried out for example by heating the starting material with a solution of sodium methoxide in methanol at superatmospheric pressure.

It is suggested, but this suggestion is put forward only by way of explanation and is in no way intended to limit the scope of the invention, that the quaternary salt is converted by the base during the process into the corresponding quaternary hydroxide and this compound, or a derivative thereof, then provides the desired product.

The compound used as starting material wherein X stands for a halide radical may be obtained by heating 2-γ-hydroxypropylpyridine-N-oxide with a halogen acid for example hydrogen bromide or hydrogen chloride.

The invention is illustrated but not limited by the following examples in which the parts are by weight:

Example 1

30 parts of 2:3-dihydro-4-H-oxazino(2,3a)-pyridinium bromide are dissolved in a solution of sodium methoxide in methanol prepared by reacting 10 parts of sodium with 160 parts of methanol and the reaction mixture is heated at 100° C. for 20 hours in a sealed vessel. The resultant solution is made just acid by the addition of 2N-hydrochloric acid, and it is evaporated to dryness. The residue is made alkaline by the addition of 60 parts of 35% aqueous sodium hydroxide and the mixture is extracted with ether. The ethereal extract is dried and is distilled and from the residue, there is obtained 2-β-methoxyethylpyridine, B.P. 94–96° C./17 mm.

Example 2

14.5 parts of 2:3-dihydro-4-H-oxazino(2,3a)-pyridinium chloride are dissolved in a solution prepared by reacting 4 parts of sodium with 64 parts of dry methanol. The reaction mixture is heated to 100° C. for 20 hours and is then cooled and neutralized with dilute aqueous hydrochloric acid to a pH of approximately 4. The mixture is evaporated to dryness under reduced pressure. The residue is treated with 18 parts of 35% sodium hydroxide solution and the mixture is extracted with ether. The ethereal extract is dried over sodium sulphate and is then evaporated. There is thus obtained 2-β-methoxyethylpyridine, B.P. 94–96° C./17 mm.

2:3-dihydro - 4 - H - oxazino(2,3a)-pyridinium chloride may be prepared by heating a solution of 12 parts of 2-γ-hydroxypropylpyridine N-oxide in 35 parts of 35% hydrochloric acid at 135° C. for 10 hours in a sealed vessel. The solution is evaporated in vacuo and the desired product is obtained as an oil.

Example 3

9 parts of 2:3-dihydro-4-H-oxazino(2,3a)-pyridinium bromide are dissolved in a solution of 4 parts of sodium hydroxide in 50 parts of methanol and the solution is heated at 100° C. for 20 hours in a sealed vessel. The resultant solution is made acid by the addition of 2 N hydrochloric acid, and the mixture is evaporated to dryness in vacuo. The residue is made alkaline by the addition of 20 parts of 35% aqueous sodium hydroxide solution and the mixture is extracted with ether. The ethereal extract is dried and the ether is removed by distillation. The residual oil is distilled and there is thus obtained 2-β-methoxyethylpyridine, B.P. 94–96° C./17 mm.

Example 4

8.5 parts of 2:3-dihydro-4-H-oxazino(2,3a)-pyridinium acetate are dissolved in a solution of 4 parts of sodium hydroxide in 50 parts of methanol and the solution is heated at 120° C. for 20 hours in a sealed vessel. The resultant solution is made acid by the addition of 2 N hydrochloric acid and the mixture is evaporated to dryness in vacuo. The residue is made alkaline by the addition of 20 parts of 35% aqueous sodium hydroxide solution and the mixture is extracted with ether. The ethereal extract is dried and the ether is removed by distillation. The residual oil is distilled and there is thus obtained 2-β-methoxyethylpyridine B.P. 94–96° C./17 mm.

What we claim is:

1. Process for the manufacture of 2-β-methoxy-ethyl-pyridine which comprises heating a quaternary salt of the formula:

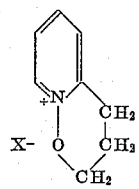

wherein X stands for an anion, with methanol in the presence of a base selected from the group consisting of alkali metal and alkaline earth metal bases.

2. Process as claimed in claim 1 wherein the anion X is an inorganic anion.

3. Process as claimed in claim 2 wherein the anion is a halide.

4. Process as claimed in claim 1 wherein the base is an alkali metal hydroxide.

5. Process as claimed in claim 4 wherein the alkali metal hydroxide is sodium hydroxide.

6. Process as claimed in claim 1 wherein the base is an alkali metal methoxide.

7. Process as claimed in claim 6 wherein the alkali metal methoxide is sodium methoxide.

8. Process as claimed in claim 1 wherein the reaction is carried out in the presence of an inert liquid medium.

9. Process as claimed in claim 8 wherein the liquid medium is selected from the group consisting of water, toluene and methanol.

10. Process as claimed in claim 1 wherein the quaternary salt is heated with a solution of sodium methoxide in methanol at superatmospheric pressure.

11. Process as claimed in claim 1 wherein the anion X is an organic anion.

12. Process as claimed in claim 1 wherein X stands for the acetate anion.

13. Process as claimed in claim 1 wherein the base is an alkaline earth hydroxide.

14. Process as claimed in claim 1 wherein X stands for a halide ion, the base is sodium methoxide and the reaction is carried out in the presence of methanol.

15. Process as claimed in claim 1 wherein the anion is selected from the group consisting of halide, sulphate, nitrate, acetate, tartrate, salicylate and toluenesulphonate.

References Cited by the Examiner

UNITED STATES PATENTS 2,667,491   1/54   Sutherland et al. _____ 260—297

WALTER A. MODANCE, *Primary Examiner.*

NICHOLAS S. RIZZO, *Examiner.*